Nov. 12, 1963  P. J. AVERY  3,110,145
HAY BALING APPARATUS
Filed Sept. 15, 1961

INVENTOR
PHILIP JOHN AVERY
By Sinton and Sinton
ATTORNEYS

# United States Patent Office 3,110,145
Patented Nov. 12, 1963

3,110,145
HAY BALING APPARATUS
Philip John Avery, Gabalong, Western Australia, Australia
Filed Sept. 15, 1961, Ser. No. 138,426
3 Claims. (Cl. 56—1)

This invention relates to improved hay bailing apparatus.

In recent years apparatus has been developed for rolling hay into bales which are substantially circular in cross section rather than pressing it into square or rectangular bundles. Apparatus hitherto used for the purpose has been complex and costly.

The object of the present invention is to provide apparatus for rolling hay into round bales which is relatively simple and which can be drawn by a tractor or the like.

In one form the invention resides in hay baling apparatus comprising an endless raking member supported on a wheeled frame adapted to be moved along by a tractor. The raking member is supported on transverse rotating members so that it assumes a substantially triangular configuration when viewed in side elevation, with the lowermost run forming the base of the triangle and being positioned close to the ground so that it contacts hay lying on the ground with a rolling action. One of the transverse members is supported between the outer end of a pair of arms pivotally mounted on the frame so that the arms rotate as the size of the rolled bale of hay increases, and permits the lowermost run of the raking member to assume a substantially concave configuration around the bale; which remains in contact with the ground at all times.

Figure 1:
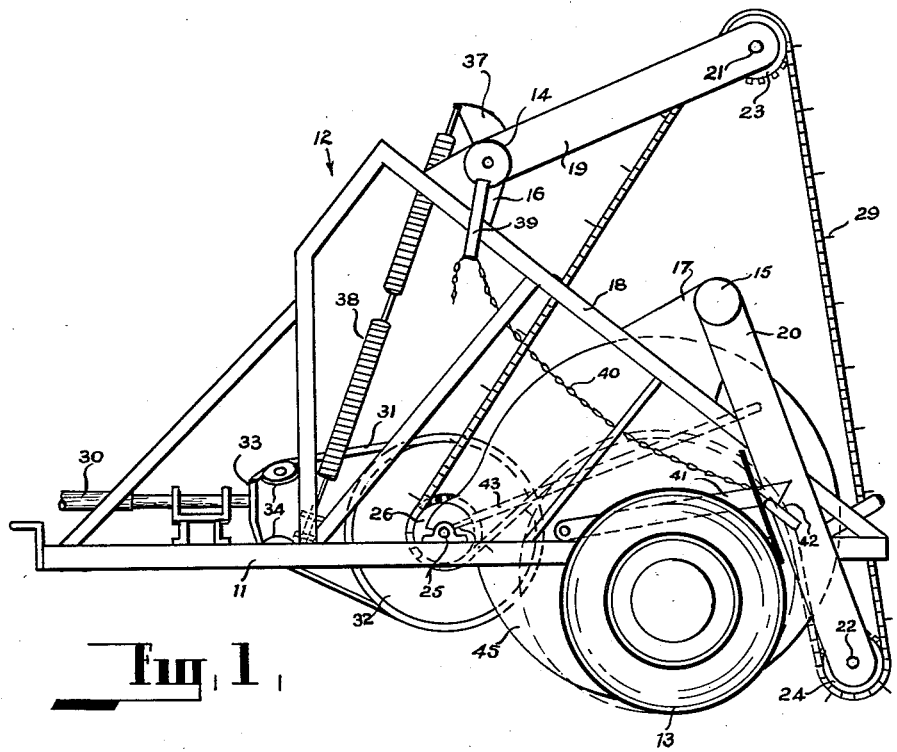
Figure 2:
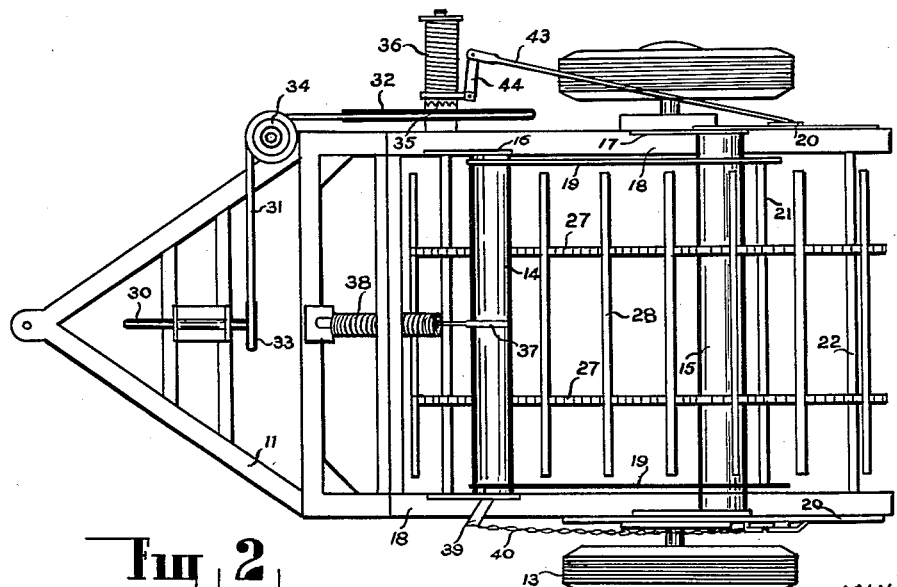

The invention will be better understood by reference to the following description of one specific embodiment thereof shown in the accompanying drawings, wherein:

FIG. 1 is a side elevation; and
FIG. 2 is a plan view.

As shown in the drawings, the apparatus comprises a base frame 11 provided with a superstructure 12 and wheels 13, one end of the frame being fitted with a coupling unit to enable the apparatus to be hitched to the tow bar of a tractor or the like. Transverse tubular shafts 14 and 15 are rotatably mounted on brackets 16 and 17 projecting outwardly from the rearwardly and downwardly inclined members 18 of the superstructure. One end of each of two pairs of arms 19 and 20 are fixed to the shafts 14 and 15 respectively. A shaft 21 is supported by the outer ends of the pair of arms 19 and a shaft 22 by the outer ends of the pair of arms 20. The shafts 21 and 22 are fitted with a pair of spaced aligned sprockets 23 and 24 respectively. A shaft 25 is transversely mounted on the base frame and is also provided with a pair of spaced sprockets 26 which are aligned with the sprockets 23 and 24. An endless chain 27 is mounted on each of the pair of sprockets, the chains being connected by a series of transverse bars 28 each of which is provided with an outwardly projecting portion 29.

The shaft 25 is driven by a drive shaft 30 adapted to be connected to the power take-off unit of the tractor through an endless belt 31 passing around a large pulley 32 mounted on the shaft 25, a small pulley 33 mounted on the drive shaft 30 and guide pulleys 34 to change the direction of travel of the belt. The pulley 32 is coupled to the shaft through a clutch 35 which is urged into the engaged position by a coiled spring 36 mounted on a portion of the shaft 25 projecting from beyond the side of the base frame. The shaft 14 to which the inner ends of the pair of arms 19 are connected is provided adjacent to the centre with an outwardly projecting member 37 connected to one end of a set of coiled springs 38 the other ends of which are anchored to the frame. One end of the shaft 14 is provided with an outwardly projecting arm 39 which is connected to one end of a chain 40. The other end of the chain 40 is connected to a locking arm 41, one end of which is pivotally mounted on the base frame. The other end of the locking arm 41 engages a catch 42 mounted on one of the arms 20. The other of the arms 20 is connected to one end of a lever 43, the other end of which is connected to one arm of a bell crank lever 44, the other arm of which bears against the inner end of the coiled spring 36. Substantially circular end plates 45 are provided on each side of the base frame. (For the sake of clarity the plates 45 have not been shown in FIG. 2 of the drawings.)

The springs 38 hold the arm 19 in an elevated position whilst the arms 20 are held in a downwardly inclined position by the locking arm 41. The endless raking member formed by the endless chains 27 and the transverse bars 28 thus assumes a substantially triangular position when viewed in side elevation with its lower run or base substantially parallel to the ground and the apex on the shaft 21.

In operation, as the apparatus is drawn along by the tractor, the raking member is driven so that the lower run travels in the same direction as the apparatus. The hay which has been windrowed into strips of a width approximately corresponding with the width of the apparatus, i.e. of the order of six feet, is engaged by the projecting portions 29 of the bars 28 and rolled into a mass which is substantially circular in cross section between the end plates 45. As the cylindrical mass of hay grows bigger, so then the lower run of the endless raking member assumes a concave shape around the cylindrical mass as indicated in broken lines in FIG. 1 whilst the arms 19 are drawn downwardly against the action of the springs 38. The movement of the arms 19 causes the lever 39 to pull on the chain 40 when the bale has reached a predetermined size to disengage the arm 41 from the lock 42, thereby releasing the arms 20 which move upwardly to allow the cylindrical bale of hay to pass rearwardly from between the end plates. As the arms 20 move upwardly, so the lever 43 rotates the bell crank lever 44 against the action of the spring 36 to disengage the clutch 35 so that the endless raking member is free to run on the various sprockets. When the endless raking member is freed, it rotates in the reverse direction as the cylindrical bale of hay is discharged from the rear of the apparatus. As soon as the bale has discharged, the arms 20 return to their normal position as do the arms 19, the locking pin 42 is engaged by the lever 41 and the clutch 35 returned to the engaged position by the spring 36, and the apparatus is again ready for operation.

Whilst the invention has been described with particular reference to one specific embodiment which is substantially automatic in operation, manually operated or hydraulically operated means may be provided for raising the arms 20 to discharge the bale.

I claim:
1. Hay baling apparatus comprising a frame capable of being attached to a tractor for being drawn thereby, ground wheels supporting said frame, an endless flexible raking member, three rotatable members having said raking member extending therearound, one of said rotatable members being rotatably mounted on said frame, a first pair of arms having one end pivotally mounted on said frame and a second rotatable member rotatably mounted on the other end thereof, resilient means tending to retain said arms extending in an upwardly in- clined position, a second pair of arms having one end pivotally connected to said frame and a third rotatable member rotatably mounted on the other end thereof, releaseable locking means retaining said second pair of arms in a downwardly inclined position, said rotatable members being positioned each at a corner of a triangle giving said endless raking member a triangular configuration when viewed in side elevation with the base thereof between said third and first rotatable members being positioned close to the ground for contacting hay lying on the ground and rolling said hay to form a substantially cylindrical bale which remains in contact with the ground at all times, while the base of said endless raking member assumes a substantially concave configuration around the upper portion of the bale moving said first pair of arms downwardly against said resilient means, means coupling said first pair of arms to said releaseable locking means to release said second pair of arms upon the downward movement of said first pair of arms to a predetermined extent permitting said bale to move from under said second pair of arms and means for driving said first rotatable member for moving said endless raking member therewith.

2. Hay baling apparatus as claimed in claim 1 wherein the endless raking member comprises a pair of endless chains spaced apart and connected by transverse members each of which is provided with a series of outwardly projecting hay engaging members.

3. Hay baling apparatus as claimed in claim 1 wherein one of the second pair of arms is connected to one end of a lever, the other end of which is connected to one arm of a bell crank lever the other arm of which bears against spring-loaded clutch means coupled to said means for driving said first rotatable member.

References Cited in the file of this patent
UNITED STATES PATENTS

| | | |
|---|---|---|
| 972,884 | Luebben | Oct. 18, 1910 |
| 2,494,946 | Ingram | Jan. 17, 1950 |
| 2,605,599 | Curry | Aug. 5, 1952 |